United States Patent
Okazaki

(10) Patent No.: US 7,920,726 B2
(45) Date of Patent: Apr. 5, 2011

(54) IMAGE PROCESSING APPARATUS, IMAGE PROCESSING METHOD, AND PROGRAM

(75) Inventor: Masaru Okazaki, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1023 days.

(21) Appl. No.: 11/300,084

(22) Filed: Dec. 14, 2005

(65) Prior Publication Data

US 2006/0152605 A1 Jul. 13, 2006

(30) Foreign Application Priority Data

Dec. 17, 2004 (JP) ................................. 2004-366467

(51) Int. Cl.
*G06K 9/00* (2006.01)
(52) U.S. Cl. ........................................ 382/118; 382/103
(58) Field of Classification Search .................. 382/117, 382/118, 141–151
See application file for complete search history.

(56) References Cited

U.S. PATENT DOCUMENTS

| | | | | |
|---|---|---|---|---|
| 5,057,921 A | * | 10/1991 | Robert et al. | 348/459 |
| 5,125,043 A | * | 6/1992 | Karlsson | 382/300 |
| 5,140,417 A | * | 8/1992 | Tanaka et al. | 375/240.01 |
| 5,164,992 A | * | 11/1992 | Turk et al. | 382/118 |
| 5,544,256 A | * | 8/1996 | Brecher et al. | 382/149 |
| 5,724,499 A | * | 3/1998 | Nishiyama et al. | 345/473 |
| 5,754,710 A | * | 5/1998 | Sekine et al. | 382/300 |
| 5,982,946 A | * | 11/1999 | Murakami | 382/272 |
| 6,072,900 A | * | 6/2000 | Chiu et al. | 382/149 |
| 6,289,113 B1 | * | 9/2001 | McHugh et al. | 382/117 |
| 6,333,993 B1 | * | 12/2001 | Sakamoto | 382/173 |

FOREIGN PATENT DOCUMENTS

JP 62-061485 A 3/1987
JP 3-022735 A 1/1991

* cited by examiner

*Primary Examiner* — Vu Le
*Assistant Examiner* — Alex Liew
(74) *Attorney, Agent, or Firm* — Canon U.S.A., Inc. I.P. Division

(57) ABSTRACT

An image processing method and apparatus for reproducing moving image data, the method and apparatus comprising detecting defects in receiving moving image data, determining the priority of each defect if there are a plurality of defects in at least one frame of the received moving image data, and performing interpolation for each defect based on the determined priority.

14 Claims, 10 Drawing Sheets

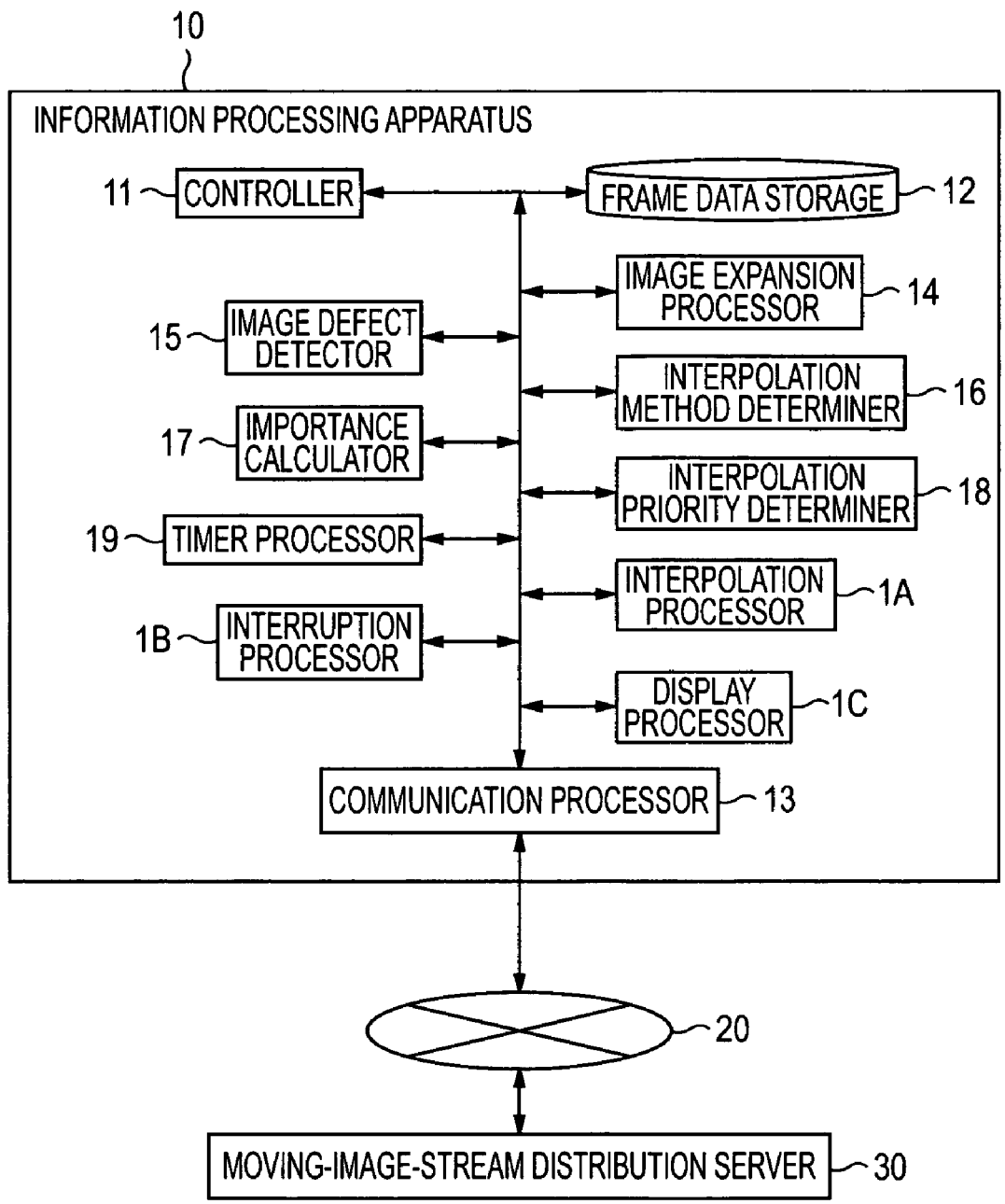

| 1 | 2 | 3 | 2 | 1 |
|---|---|---|---|---|
| 2 | 6 | 8 | 6 | 2 |
| 3 | 8 | 10 | 8 | 3 |
| 2 | 6 | 8 | 6 | 2 |
| 1 | 2 | 3 | 2 | 1 |

IMAGE PROCESSING APPARATUS, IMAGE PROCESSING METHOD, AND PROGRAM

BACKGROUND OF THE INVENTION

1. Field of the Invention

The present invention relates to an image processing apparatus, method, and program for reproducing moving image data distributed via a communication medium, such as a network.

2. Description of the Related Art

The variety of techniques used in data transmission between computers has increased, as personal computers become widespread and networks become faster these days.

For example, transmission of moving image data over computer networks has become commonplace. In response, servers for the real-time stream distribution of moving image data have been put to practical use.

However, when communication conditions are bad due to network congestion or other reasons, there are cases where computers cannot receive all image data as originally intended. The quality of real-time images received under such conditions is significantly degraded when computers reproduce the images.

To improve the degraded quality of reproduced images, there is provided a technique in which interpolation is performed to correct defective portions using the preceding frames. There is also a technique in which interpolation is performed on packets of images that are considered to be easily interpolated, while packets of images that are considered difficult to be interpolated are retransmitted.

However, since a high level of real-time data transmission is required for videophones, security cameras, and the like, it is desirable that the amount of buffered images be minimized. Moreover, interpolation is required to ensure that images can be displayed optimally according to the capability of a display device at the receiving side.

SUMMARY OF THE INVENTION

The present invention has been achieved in view of the problems described above, and provides an image processing apparatus, an image processing method, and a program that are capable of performing appropriate interpolation, without performing retransmission, to reduce defects in received images according to the nature of the image degradation.

In one aspect of the present invention, an image processing apparatus configured to receive moving image data via a network includes a defect detecting unit adapted to detect defects in received moving image data, a priority determining unit adapted to determine the priority of each defect if there are a plurality of defects in at least one frame of the received moving image data, and an interpolation processing unit adapted to perform interpolation for each defect according to the priority determined by the priority determining unit.

In another aspect of the present invention, an image processing method for an image processing apparatus configured to receive moving image data via a network includes a defect detecting step of detecting defects in received moving image data, a priority determining step of determining the priority of each defect if a plurality of defects are detected in at least one frame of the received moving image data, and an interpolation processing step of performing interpolation for each defect according to the priority determined in the priority determining step.

In still another aspect of the present invention, computer-executable process steps for an image processing apparatus configured to receive moving image data includes the steps of a defect detecting step of detecting defects in received moving image data, a priority determining step of determining the priority of each defect if a plurality of defects are detected in at least one frame of the received moving image data, and an interpolation processing step of performing interpolation for each defect according to the priority determined in the priority determining step.

Further features of the present invention will become apparent from the following description of exemplary embodiments with reference to the attached drawings.

BRIEF DESCRIPTION OF THE DRAWINGS

FIG. 2 is a block diagram showing an exemplary functional configuration of an information processing apparatus and an exemplary system including the information processing apparatus according to the first embodiment of the present invention.

DESCRIPTION OF THE EMBODIMENTS

Exemplary embodiments of the present invention will now be described in detail with reference to the drawings.

First Embodiment

First, an image processing apparatus having a function of receiving and reproducing moving image streams distributed via a network will be described as an example of an information processing apparatus (image processing apparatus) according to the first embodiment of the present invention.

The information processing apparatus of the present embodiment uses a plurality of correction (interpolation) methods in a timely manner to reduce defects created in image data when receiving a moving image stream. Examples of the plurality of correction methods include an intraframe interpolation method and an interframe interpolation method. The intraframe interpolation method is performed either by relatively easy interpolation processing using neighboring macroblocks or by more complex interpolation processing.

When a function that achieves such a complex correction method is built in the information processing apparatus, the function implemented by software allows better scalability than that implemented by hardware. For example purposes, the features of the present embodiment will be described as being implemented by software. However, the features may also be implemented by hardware.

Figure 1:
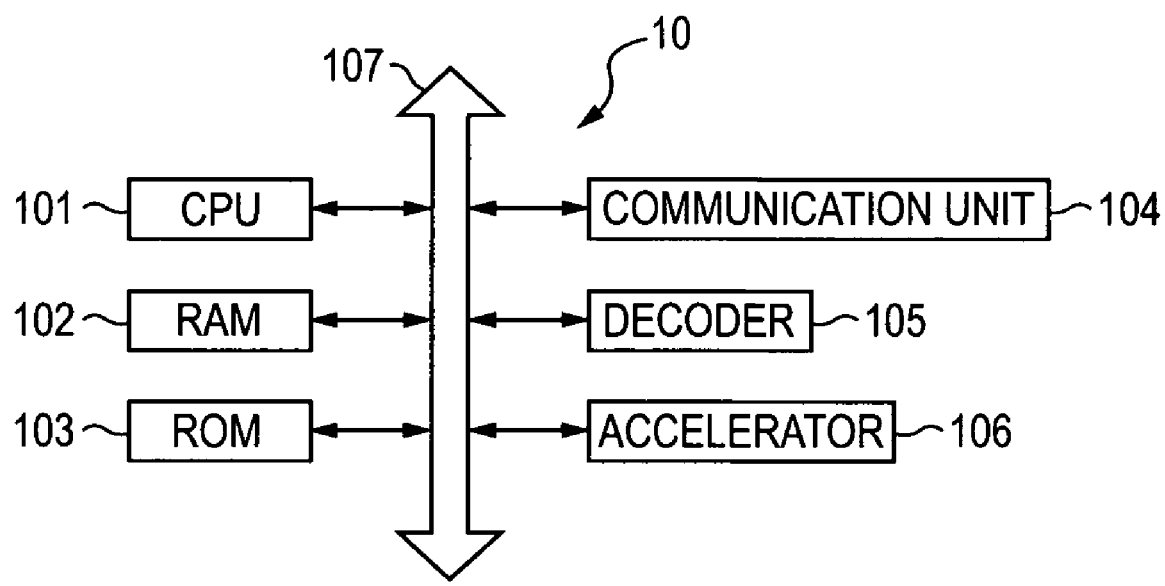
FIG. 1 shows an exemplary hardware configuration of an information processing apparatus (image processing apparatus) according to a first embodiment of the present invention.

FIG. 1 shows an exemplary hardware configuration of the information processing apparatus (image processing apparatus) according to the first embodiment.

As shown in FIG. 1, the information processing apparatus 10 of the present embodiment includes a central processing unit (CPU) 101 for performing computations and controlling the overall operations of the information processing apparatus 10, and a random access memory (RAM) 102 serving as a work area and buffer for computations performed by the CPU 101. The information processing apparatus 10 further includes a read-only memory (ROM) 103 for storing programs, a communication unit 104 for communicating with external devices via a network, and a decoder 105 for expanding data when a moving image stream received via a communication medium by the communication unit 104 is compressed data. The information processing apparatus 10 further includes an accelerator 106 in hardware for accelerating interpolation for correcting (reducing) defects in images, and a bus 107 for connecting the components described above. While the functions of the decoder 105 and accelerator 106 may be implemented by software, they are implemented by hardware in the information processing apparatus 10 of the present embodiment for accelerating the processing. When moving image stream data is sequentially inputted, the decoder 105 interprets the stream data and outputs expanded image data in appropriate time intervals.

When moving image stream data (hereinafter referred to as "stream data") is received by the communication unit 104 via a communication medium, lower-layer communication is processed by the communication unit 104. Specifically, the communication unit 104 transfers the stream data stored in an internal buffer to the RAM 102 by direct memory access (DMA) (not shown). The upper-layer communication is processed by the CPU 101 using software.

The following describes a function achieved when various programs, executed by the CPU 101, work in conjunction with the hardware shown in FIG. 1.

FIG. 2 is a block diagram showing an exemplary functional configuration of the information processing apparatus 10 and an exemplary system including the information processing apparatus 10 according to the present embodiment.

As shown in FIG. 2, the information processing apparatus 10 is a general-purpose computer terminal connectable to a network 20 and has the hardware configuration shown in FIG. 1. The network 20 is a communication network, such as the Internet, and includes a wireless local area network (LAN) (not shown) in the present embodiment. A moving-image-stream distribution server 30 is a server for distributing moving image streams via the network 20.

For example purposes, the network 20 serving as a communication channel between the moving-image-stream distribution server 30 and the information processing apparatus 10 includes a wireless LAN, which tends to cause communication packets to be dropped.

The functional configuration of the information processing apparatus 10 will now be described. A controller 11 controls each section and data flow within the information processing apparatus 10. Frame data storage 12 is a memory for storing image data, which is to be processed, on a frame-by-frame basis. The controller 11 and the frame data storage 12 are implemented by the CPU 101, the RAM 102, and the like.

A communication processor 13 communicates with external devices via the network 20. For example, the communication processor 13 receives stream data via the network 20 from the moving-image-stream distribution server 30 and performs receive processing. The communication processor 13 has a function of determining whether a communication error occurs. The function of the communication processor 13 is implemented by the communication unit 104, CPU 101, RAM 102, and the like.

An image expansion processor 14 expands the stream data on which receive processing has been performed by the communication processor 13 and outputs image data. The function of the image expansion processor 14 is implemented by the decoder 105, CPU 101, RAM 102, and the like.

An image defect detector 15 detects the location and number of defects in the image data outputted by the image expansion processor 14. While the details will be described below, it is presumed that the defects in the image data have been created because, for example, the communication processor 13 failed to perform receive processing (failed to obtain image data) for some reason. It can also be presumed that the defects have been created because the image expansion processor 14 failed to perform expansion processing (decoding).

An interpolation method determiner 16 determines an appropriate interpolation method for correcting each defect detected by the image defect detector 15. Specifically, the interpolation method determiner 16 determines an appropriate interpolation method on the basis of whether there is a correlation between the content of a defective frame and the content of its preceding and following frames, or on the basis of image information (e.g. coloration, brightness, edge, object, and the like) about the defective frame.

An importance calculator 17 calculates the importance of each defect detected by the image defect detector 15. Specifically, the importance calculator 17 calculates the importance of each defect detected by the image defect detector 15 according to the distance from the image center to each defect.

An interpolation priority determiner 18 determines the priority of interpolation of each defect on the basis of the level of importance outputted by the importance calculator 17 and the level of correction difficulty. The level of correction difficulty means the level of difficulty in correcting a defect (i.e., the level of difficulty in performing interpolation). Since accurate interpolation needs to be performed for larger defective areas, which are more noticeable, the interpolation priority determiner 18 calculates the level of correction difficulty on the basis of a defective area coefficient indicating the size of the defective area.

A timer processor 19 determines a timeout period for performing interpolation and starts a timer. The timeout period is a period of several milliseconds within which each frame must be processed to smoothly reproduce stream data, and is specified on the basis of the frame rate of the stream.

An interpolation processor 1A performs interpolation for each defect according to priorities determined by the interpolation priority determiner 18 using an interpolation method determined by the interpolation method determiner 16, and outputs interpolated image data. The interpolation processor 1A stops interpolation in response to a stop command from an interruption processor 1B described below.

Upon receipt from the timer processor 19 of information indicating that a timeout has occurred, the interruption processor 1B outputs a stop command to cause the interpolation processor 1A to stop interpolation. A display processor 1C causes image data interpolated by the interpolation processor 1A to be displayed on a display device (not shown in FIG. 2). While not shown in FIG. 1 and FIG. 2, the information processing apparatus 10 includes input devices, such as a mouse and a keyboard, and a display device, such as a cathode ray tube (CRT) or a liquid crystal display.

Figure 3A:
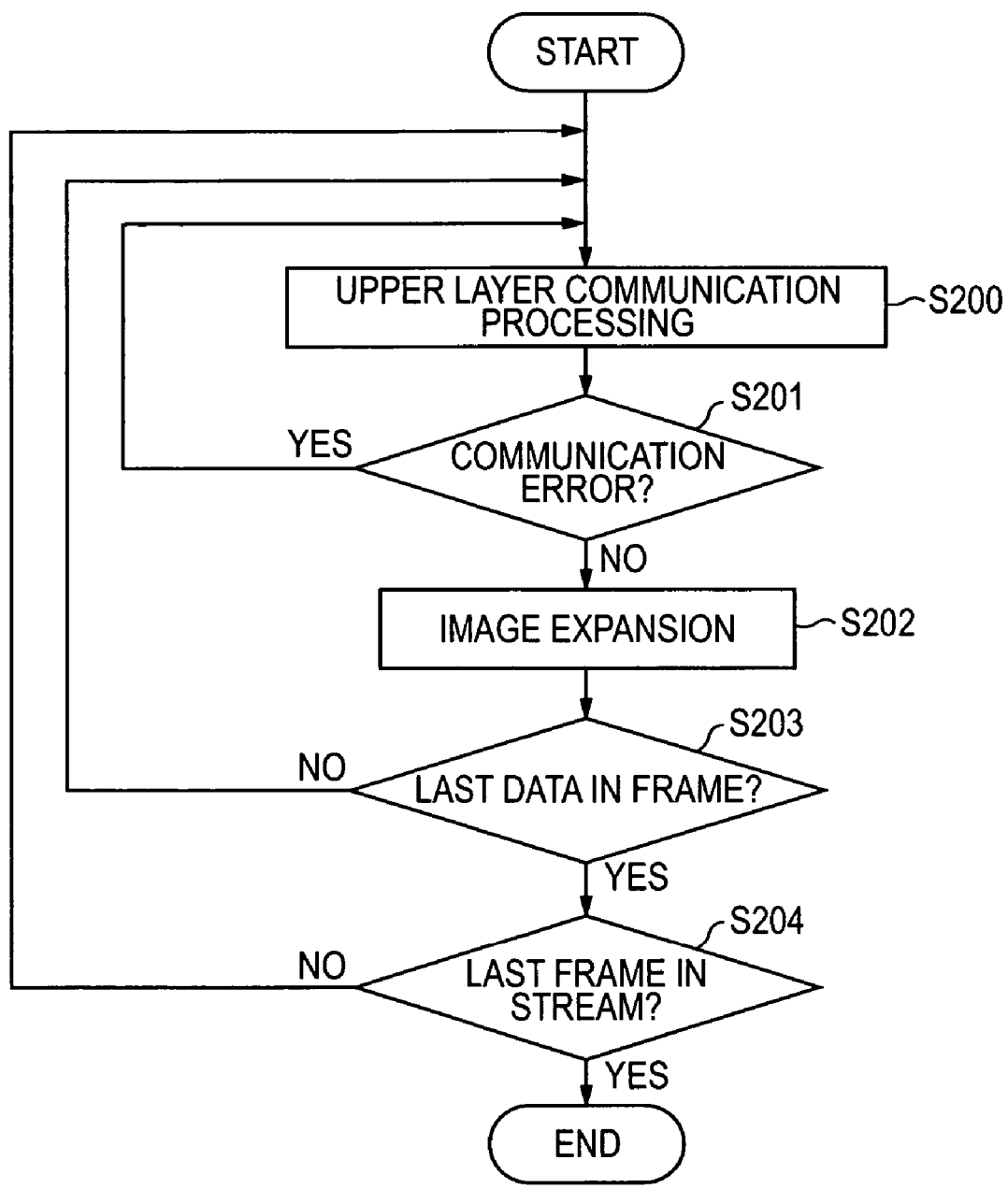
FIG. 3A is a flowchart showing an exemplary process of receiving a moving image stream in the information processing apparatus according to the first embodiment of the present invention.

The process of receiving a moving image stream in the information processing apparatus 10 of the present embodiment will now be described. FIG. 3A is a flowchart showing an exemplary process of receiving a moving image stream in the information processing apparatus 10.

In step S200, the communication processor 13 performs higher-layer communication processing, such as Internet protocol (IP) packet processing or transmission control protocol (TCP) packet processing, on data processed by lower-layer communication processing. Next, in step S201, the communication processor 13 determines, by a cyclic redundancy check (CRC) or the like, whether or not a communication error has occurred. If it is determined that no communication error has occurred, the process proceeds to step S202, where the image expansion processor 14 performs image expansion on a packet-by-packet basis and stores the resultant image in the RAM 102 of the frame data storage 12.

If the communication processor 13 detects a communication error in step S201, image expansion in step S202 is not performed. The process returns to step S200 and the communication processor 13 waits for the input of packets in the subsequent communication.

Since image expansion performed by the image expansion processor 14 generally involves high load, the decoder 105 in hardware is used to reproduce real-time moving images. However, reproducing real-time moving images can be performed via software. Since it is generally less likely that a frame of moving image data fits in a single communication packet, processing performed on a packet-by-packet basis in steps S200 to S202 needs to be repeated until all data constituting a single frame is received. Thus, in step S203, the communication processor 13 determines whether a frame of data has been received.

If the communication processor 13 determines that a frame of data has been received ("Yes" in step S203), the process proceeds to step S204, where the communication processor 13 determines whether the last frame of the moving image stream currently being received has been received. The receive processing ends if it is determined that the last frame has been received. If it is determined in step S204 that the last frame has not been received, the process returns to step S200.

During the process of receiving a moving image stream in FIG. 3A, the information processing apparatus 10 performs defect detection and interpolation on a frame of image data upon completion of the receipt thereof in step S203.

Figure 3B:
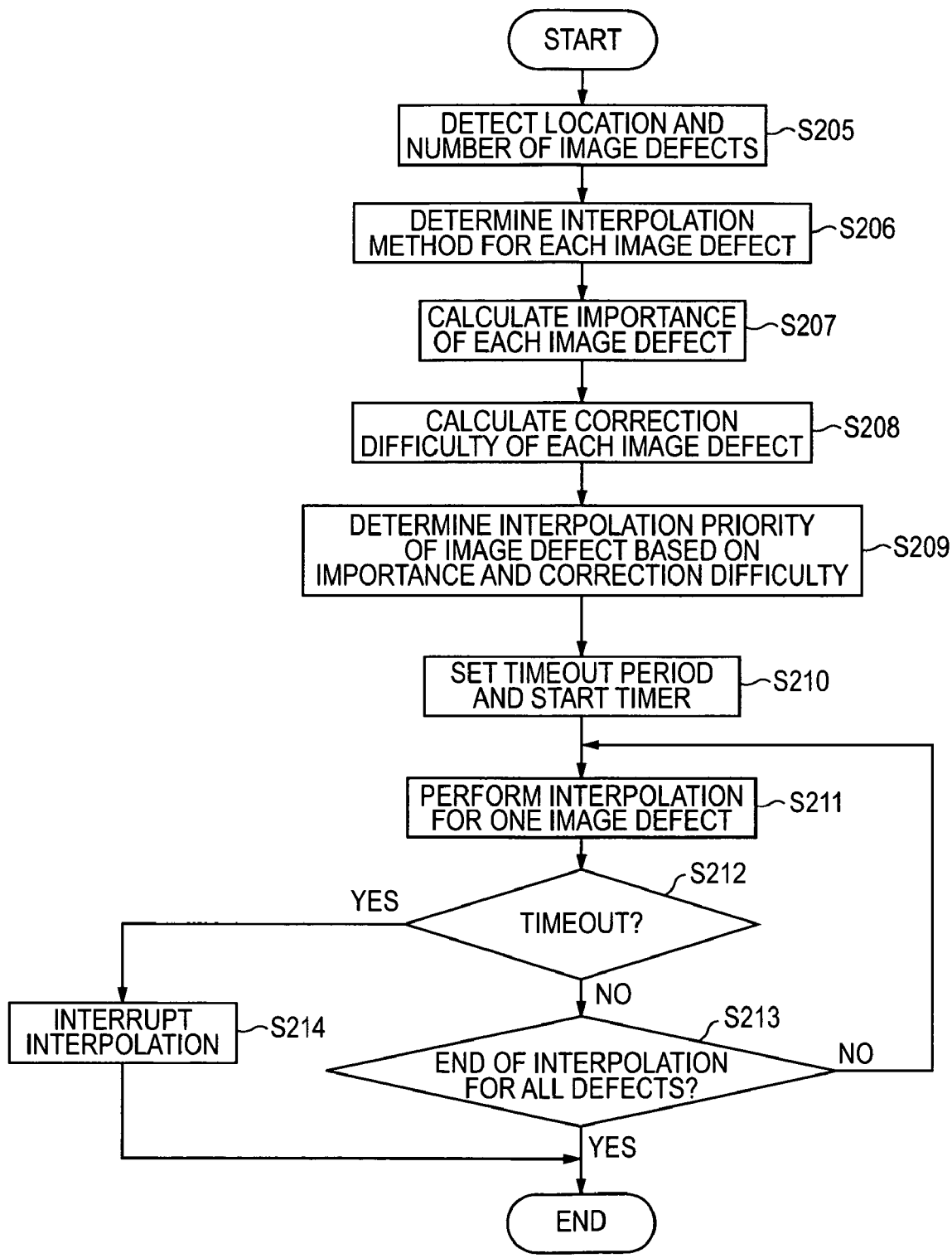
FIG. 3B is a flowchart showing an exemplary process of defect detection and interpolation performed on a moving image stream received in the information processing apparatus of the first embodiment of the present invention.

FIG. 3B is a flowchart showing an exemplary process of defect detection and interpolation performed on a moving image stream received in the information processing apparatus 10 of the present embodiment.

In step S205, the image defect detector 15 detects the number and location of defects in image data read from the frame data storage 12. The present embodiment takes the following two points into consideration as causes of defects in the image data:

(1) Communication error, including the case where a communication packet fails to arrive; and (2) Decoding error, (i.e., processing error in the image expansion processor 14).

The present invention is not limited to considering only these two points as causes of defects in the image data, and any other conditions that would cause a defect in the image data are taken into consideration.

In particular, even if a communication error occurs as in (1) above, a defect in an image can be easily located if it is clear that data of which point in the image is contained in a communication packet upon arrival thereof.

For example, the following discusses the processing of image defects when the real-time transport protocol (RTP) is used in a communication transport layer and the motion JPEG format is used as an image compression format.

Figure 4A:
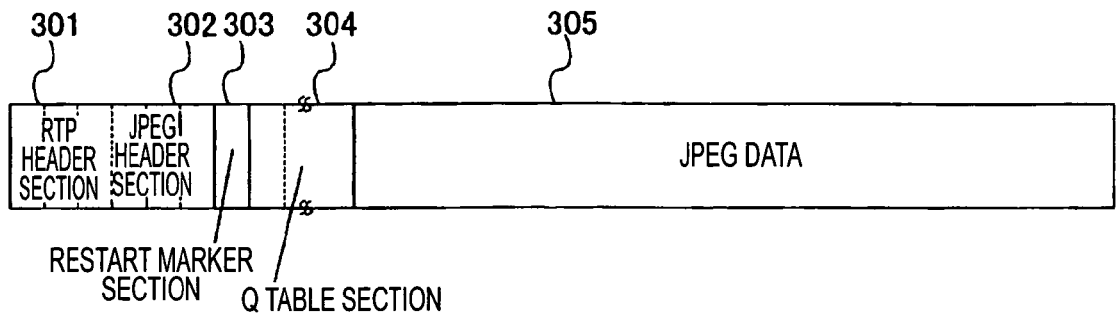
FIG. 4A shows an exemplary packet configuration when the image format of stream data is the motion Joint Photographic Experts Group (JPEG) format.

FIG. 4A shows an exemplary packet configuration when the image format of stream data is the motion JPEG format. As shown, the motion JPEG format includes an RTP header section 301, a JPEG header section 302, a restart marker section 303, a Q-table section 304, and JPEG data 305.

If the restart marker section 303, serving as a partition of the JPEG data 305, is placed at a frequency that allows the JPEG data 305 to fit in a single packet, the beginning of the payload, excluding the RTP header section 301 and the JPEG header section 302, is the restart marker section 303. The RTP header section 301 describes the position of a macroblock containing data to be received after the restart marker section 303 in the sequence of macroblocks within a frame. This enables the information processing apparatus 10 to recognize the location, within the image, to which the beginning of the macroblock in the packet currently being processed corresponds. If the JPEG data 305 is dropped, the image defect detector 15 refers to the RTP header section 301 to locate the corresponding defect within the image frame.

Figure 4B:
FIG. 4B shows an exemplary data configuration of a restart marker section in FIG. 4A.

FIG. 4B shows an exemplary data configuration of the restart marker section 303 shown in FIG. 4A. As shown in FIG. 4B, a restart interval 401 and a restart count 402 are stored in the restart marker section 303. The restart interval 401 indicates every how many macroblocks a restart marker is placed, while the restart count 402 indicates what number the restart marker is. Using the information stored in the restart marker section 303 allows the determination of what number the macroblock at the beginning of the packet is by multiplying the restart interval 401 by the restart count 402.

In the present embodiment, if the RTP header section 301 can be referred to when a communication error has been detected in step S201, the image defect detector 15 uses information from the RTP header section 301 to calculate the location of the macroblock in the dropped packet within the image.

Figure 5:
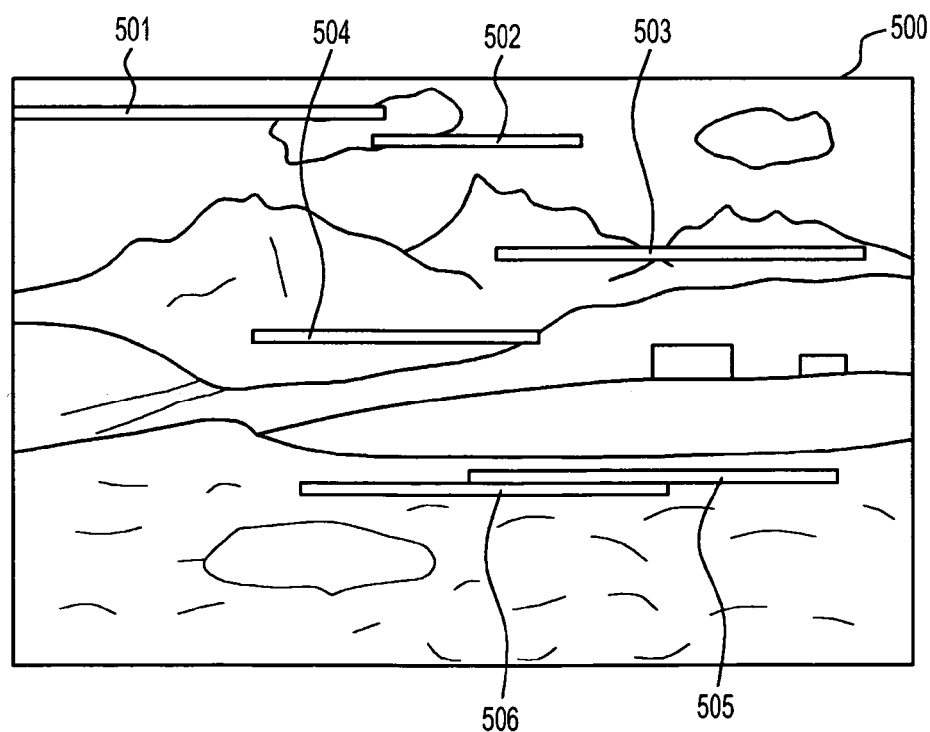
FIG. 5 shows exemplary defects in an image.

By processing a plurality of packets in the same manner, the image defect detector 15 identifies the coordinates of macroblocks that have not been processed in the moving image frame and detects image defects created due to communication errors. For example, defects 501 to 506 of an image 500 shown in FIG. 5 are exemplary defects caused by communication errors.

Returning to FIG. 3B, in step S206, the interpolation method determiner 16 determines an interpolation method appropriate for correcting (reducing) each of the defects (e.g., defects 501 to 506 in FIG. 5) of an image. For example, if scene changes take place between the current image frame and the preceding and following image frames, the interpolation method determiner 16 determines to perform intraframe interpolation instead of interframe interpolation. Moreover, depending on the nature of the defect, the interpolation method determiner 16 selects one of a plurality of intraframe interpolation methods available. If no scene change takes place between the current image frame and the preceding and following image frames, the interpolation method determiner 16 may determine to perform interframe interpolation. The interpolation method determiner 16 determines whether to perform interpolation between image frames, for example, by determining the degree of similarity between the image frames.

Next, in step S207, the importance calculator 17 calculates the importance of each of the defects 501 to 506. The importance calculator 17 of the present embodiment, for example, determines importance parameters according to the distance from the image center. However, any method for determining importance parameters that would enable practice of the present invention is applicable. The importance calculator 17 calculates the importance of each defect using these parameters.

Figures 6, 7:
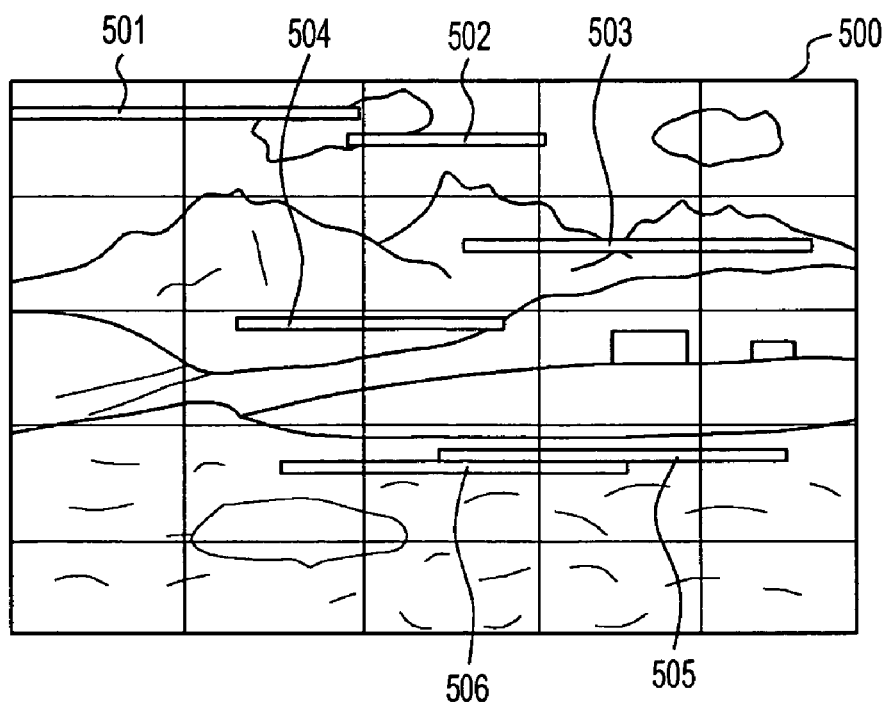
FIG. 6 shows exemplary parameters indicating the level of importance according to the distance from the image center.
FIG. 7 is a diagram in which an area segmented in FIG. 6 is superimposed on the image with defects shown in FIG. 5.

FIG. 6 shows exemplary parameters indicating the level of importance according to the distance from the image center. As shown, the image is divided vertically and horizontally into five equal areas, which are assigned parameters (hereinafter called "area coefficients") according to the distance from the image center. FIG. 7 is a diagram in which an area segmented in FIG. 6 is superimposed on the image 500 with the defects 501 to 506 shown in FIG. 5. The area coefficient of each of the defects 501 to 506 is the highest value of all area coefficients assigned to areas over which each defect extends. For example, the defect 503 extends over areas to which area coefficients 8, 6, and 2 are assigned. Since the highest area coefficient is 8 in this case, the importance calculator 17 determines that the area coefficient for the defect 503 is 8. In the present embodiment, the area coefficient calculated by the importance calculator 17 is equivalent to the level of importance.

Returning to FIG. 3B, in step S208, the interpolation priority determiner 18 calculates the level of correction difficulty of each of the defects 501 to 506 on the basis of the size of each defect. In the present embodiment, the level of correction difficulty indicating the difficulty in correcting each defect by interpolation increases as the size of each defect increases. For example, if an image frame including defects is received immediately after a scene change, the intraframe interpolation method is selected as an interpolation method to be used. It is not particularly difficult to correct a long and narrow defect by the intraframe interpolation method. However, the level of correction difficulty increases, for example, as the length of the shorter side of a defective area increases due to the defects 505 and 506 that are in contact with each other. That is, more complex processing is required for a larger defective area, because, as the size of a defective area increases, difficulty in correcting the defect by interpolation increases, while interpolation with higher accuracy is required because of a larger impact on the appearance of the image. Since the defects 505 and 506 in FIGS. 5 and 7 are in contact with each other, complex interpolation is required for correcting them.

The level of correction difficulty can be determined by the following equation:

$$\text{Level of correction difficulty} = (n-1) \times m$$

where "n" is the number of defects vertically in contact with each other, while "m" is an area coefficient.

For example, for each of the defects 505 and 506 in FIG. 5, the interpolation priority determiner 18 obtains a level of correction difficulty of 5 by substituting the number of contacting defects n=2 and the area coefficient m=5 into the equation described above. That is, the interpolation priority determiner 18 determines that the level of correction difficulty of each of the defects 505 and 506 is 5.

In step S209, the interpolation priority of each defect is determined by the interpolation priority determiner 18 on the basis of the level of importance determined by the importance calculator 17 and the level of correction difficulty determined by the interpolation priority determiner 18. In the present embodiment, the level of importance is added to the level of correction difficulty to determine the sum of coefficients with respect to each defect, and the interpolation priority of each defect can be obtained by arranging the resultant sums in descending order.

For example, as in Table 1 below, the interpolation priority determiner 18 determines the interpolation priority of each of the defects 501 to 506 in FIGS. 5 and 7 on the basis of the sum of the level of importance and the level of correction difficulty.

TABLE 1

| DEFECT NUMBER | IMPORTANCE | CORRECTION DIFFICULTY | SUM OF COEFFICIENTS | INTERPOLATION PRIORITY |
|---|---|---|---|---|
| 501 | 2 | 0 | 2 | 6 |
| 502 | 3 | 0 | 3 | 5 |
| 503 | 8 | 0 | 8 | 4 |
| 504 | 10 | 0 | 10 | 3 |
| 505 | 8 | 5 | 13 | 1 |
| 506 | 8 | 5 | 13 | 2 |

As shown in Table 1, the defects 505 and 506 are given the first and second interpolation priorities, respectively, while the defects 504, 503, 502, and 501 are given the third, fourth, fifth, and sixth interpolation priorities, respectively.

Next, in step S210, the timer processor 19 sets a timeout period for performing interpolation, and then starts a timer. For example, the timer processor 19 estimates the time at which the interpolation priority determiner 18 starts processing the next moving image frame, thereby determining a timeout period on the basis of the estimated time.

For example, when the frame rate is 30 fps (frames per second), the timer processor 19 estimates that the interpolation priority determiner 18 starts processing the next moving image frame in 1/30 seconds=33.33 milliseconds, and sets a timeout period of 30 milliseconds to allow for some margin of time. Thus, interpolation for a single frame can be performed for up to 30 milliseconds. Then, in step S210, the timer processor 19 sets a timeout period of 30 milliseconds, and starts the timer.

In step S211, the interpolation processor 1A perform interpolation for one of the defects by the corresponding interpolation method determined by the interpolation method determiner 16 in step S206. The interpolation processor 1A performs interpolation according to the interpolation priorities determined by the interpolation priority determiner 18 in step S209. In the above example, the interpolation priorities would be defects 505, 506, 504, 503, 502, and 501.

In step S212, every time interpolation for a single defect is completed, the timer processor 19 determines whether a timeout has occurred. If the timer processor 19 determines that a timeout has not occurred, the interpolation processor 1A determines in step S213 whether interpolation for all defects has been completed. Interpolation ends if it is determined in step S213 that interpolation for all defects has been completed. If it is determined in step S213 that interpolation for all defects has not been completed, the process returns to step S211 and the interpolation processor 1A performs interpolation for the next defect.

If the timer processor 19 determines in step S212 that timeout has occurred, the controller 11 sends a command to the interpolation processor 1A to stop interpolation. Upon receipt of the command, the interpolation processor 1A terminates interpolation. At the same time, the controller 11 releases resources, such as memories, obtained for performing interpolation. Thus, the moving image stream can be reproduced smoothly, since the interpolation performed on the current moving image frame is interrupted and terminated when a timeout occurs, even if interpolation for all defects has not been completed. Although interpolation may be interrupted, interpolation for important defects can be reliably performed, as the important defects are given higher interpolation priorities.

In the present embodiment, it is determined whether or not a timeout has occurred every time interpolation for one defect is completed. The present invention may also be configured such that interpolation is terminated when an interrupt occurs. In this case, in the interruption of interpolation in step S214, interpolated pixels are outputted even if interpolation for all defects has not been completed, while, at the same time, the controller 11 releases obtained resources.

As described above, communication errors, such as packet losses, are unavoidable when moving image streams are transmitted through a less reliable communication channel, such as the network 20 including a wireless LAN. Therefore, when real-time transmission of moving images is required, performing interpolation for the correction of defects provides the ability to maintain image quality.

In order to reduce defects to allow viewers to feel comfortable with images, it is necessary to select an appropriate interpolation method from a plurality of options depending on the situation. Moreover, since the amount of time available to perform interpolation is limited during real-time playback of moving image streams, interpolation for all defects may not be completed if, in particular, the function of interpolation is implemented by software. Therefore, the information processing apparatus 10 performs interpolation for defects according to interpolation priorities determined on the basis of the importance of each defect. This processing allows interpolation for important defects to be reliably performed, and thus, high-quality moving images to be distributed to viewers.

The present embodiment provides an example in which interpolation for image defects is performed on a macroblock basis, as information transmitted via a communication medium is based on moving image streams compressed on a macroblock basis. If, for example, images are transmitted via a communication medium on a slice-by-slice basis, interpolation may be performed on a slice-by-slice basis. Interpolation under the current invention is not limited to these two methods, and interpolation may be performed on any basis that is compatible with the associated basis with which the information is transmitted.

In the present embodiment, to determine the distance from the image center to each defect, the image is divided into a plurality of weighted areas to extract defects included in the areas. Alternatively, the distance from the image center to each defect may be simply calculated to perform weighting according to the calculated distance. The present invention is not limited to these two methods of determining/calculating the distance from the image center to each defect, and any method that would allow practice of the present invention is applicable.

While the present embodiment uses both the level of importance and the level of correction difficulty to determine the interpolation priority of each defect, the present invention is not limited to using only both. For example, either the level of importance or correction difficulty may be used alone for determination. Also, another parameter, such as the brightness of each defect, may be used in combination with either one or both to determine the interpolation priority.

Second Embodiment

An exemplary image processing apparatus according to the second embodiment of the present invention will now be described with reference to FIG. 3A, FIG. 3B, and FIG. 8.

While the information processing apparatus (image processing apparatus) 10 of the first embodiment is configured such that the functions of interpolation are primarily implemented by software, the image processing apparatus of the second embodiment is configured such that the functions of interpolation are primarily implemented by hardware.

Figure 8:
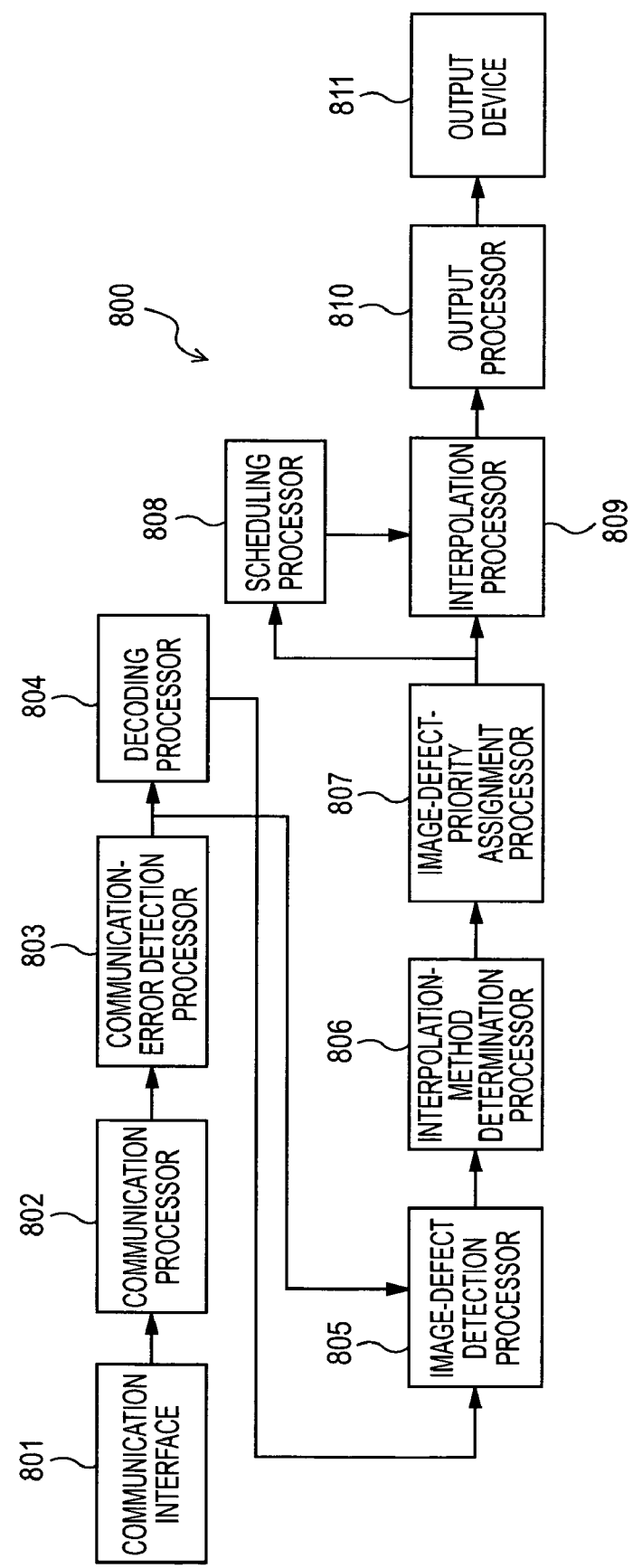
FIG. 8 is a block diagram showing an exemplary image processing apparatus according to a second embodiment of the present invention.

FIG. 8 is a block diagram showing an exemplary image processing apparatus according to the second embodiment. Since functions associated with interpolation are the same as those in the information processing apparatus 10 of the first embodiment, each block of an image processing apparatus 800 according to the second embodiment will be described with reference to the flowcharts in FIGS. 3A and 3B used in the first embodiment.

As shown in FIG. 8, the image processing apparatus 800 includes a communication interface 801, a communication processor 802, a communication-error detection processor 803, a decoding processor 804, and an image-defect detection processor 805. The image processing apparatus 800 further includes an interpolation-method determination processor 806, an image-defect-priority assignment processor 807, a scheduling processor 808, an interpolation processor 809, an output processor 810, and an output device (e.g., display) 811.

First, the communication interface 801 receives moving image streams via a network, such as the Internet or a wireless LAN. The communication processor 802 performs packet processing corresponding to step S200 in FIG. 3A. Next, the communication-error detection processor 803 detects errors in data being transmitted (corresponding to step S201). If the communication-error detection processor 803 detects no communication error, the decoding processor 804 expands the received compressed image data (corresponding to step S202). The operations described so far are performed successively every time a communication packet arrives. The operations described below are performed after a frame of moving image data arrives. The decoding processor 804 or the like has a memory for storing a frame of moving image data.

The image-defect detection processor 805 detects the location and number of image defects in a frame of moving image data expanded by the decoding processor 804 (corresponding to step S205). If the communication-error detection processor 803 detects errors in communication data, the image-defect detection processor 805 detects defects in moving image data using information about the errors detected by the communication-error detection processor 803.

Next, the interpolation-method determination processor 806 determines an interpolation method appropriate for each of the defects detected by the image-defect detection processor 805 (corresponding to step S206). Then, the image-defect-priority assignment processor 807 assigns an interpolation priority to each of a plurality of defects detected within a single frame to determine the interpolation order in which interpolation is performed (corresponding to steps S207, S208, and S209).

Next, the scheduling processor 808 and the interpolation processor 809 perform interpolation for each defect according to the interpolation priorities determined by the image-defect-priority assignment processor 807. The scheduling processor 808 sets a timeout period until interpolation for the next frame starts, and controls interpolation performed by the interpolation processor 809. The interpolation processor 809 performs interpolation under the control of the scheduling processor 808 by the interpolation methods determined by the scheduling processor 808 (corresponding to steps S211 to S214). Interpolation ends if interpolation for all defects is completed or if a timeout occurs. Then, the output processor 810 performs post-processing according to an output method, and outputs moving images to the display 811 or other output devices.

As described above, similar to the information processing apparatus 10 of the first embodiment, the image processing apparatus 800 of the present embodiment assigns a priority to each of a plurality of defects created in a single moving image frame (screen) due to, for example, the loss of communication data, thereby efficiently performing interpolation. The image processing apparatus 800 may further include a CPU and a memory, for example, to allow software to perform some complex processing functions in each block in FIG. 8.

Third Embodiment

An exemplary information processing apparatus (image processing apparatus) according to the third embodiment of the present invention will now be described with reference to FIG. 9 and FIG. 10. The third embodiment differs from the first embodiment in terms of methods for determining the interpolation priority of each defect.

The preconditions of the information processing apparatus 10 of the present embodiment, and the configuration and flow (see FIGS. 3A and 3B) for performing interpolation in the information processing apparatus of the present embodiment are the same as the configuration (see FIG. 1 and FIG. 2) and operations (see FIG. 3A and FIG. 3B) of the information processing apparatus 10 of the first embodiment described above. Therefore, differences between the information processing apparatus 10 of the third embodiment and that of the first embodiment will be described with reference to FIG. 3A and FIG. 3B. Specifically, the information processing apparatus 10 of the third embodiment differs from that of the first embodiment in terms of processing performed by the importance calculator 17 and interpolation priority determiner 18 shown in FIG. 2.

To determine the importance of each defect, the importance calculator 17 of the present embodiment calculates a coefficient based on the distance from the image center to each defect and a spatial frequency in an image area including the defect. An image with a high spatial frequency (many high-frequency components) has high complexity and high contrast. A method for determining the importance of each defect in the present embodiment is based on the assumption that a complex part of an image often overlaps with an important part of the image. The extraction of coefficients based on the distance from the image center to each image area is performed in the same manner as that described in the first embodiment.

A calculation method that the importance calculator 17 uses for determining a coefficient based on a spatial frequency will now be described with reference to FIG. 9 and FIG. 10.

Figure 9:
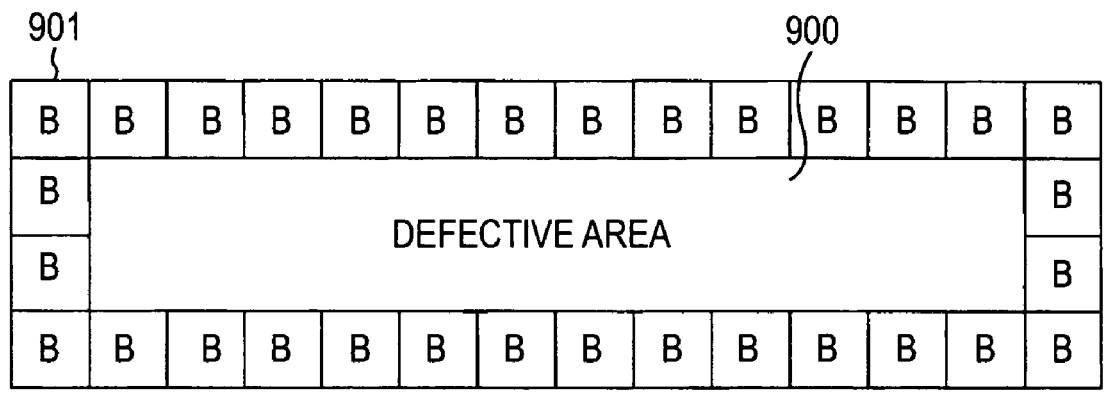
FIG. 9 shows an exemplary defective area (defect) in an image according to a third embodiment of the present invention.
Figure 10:
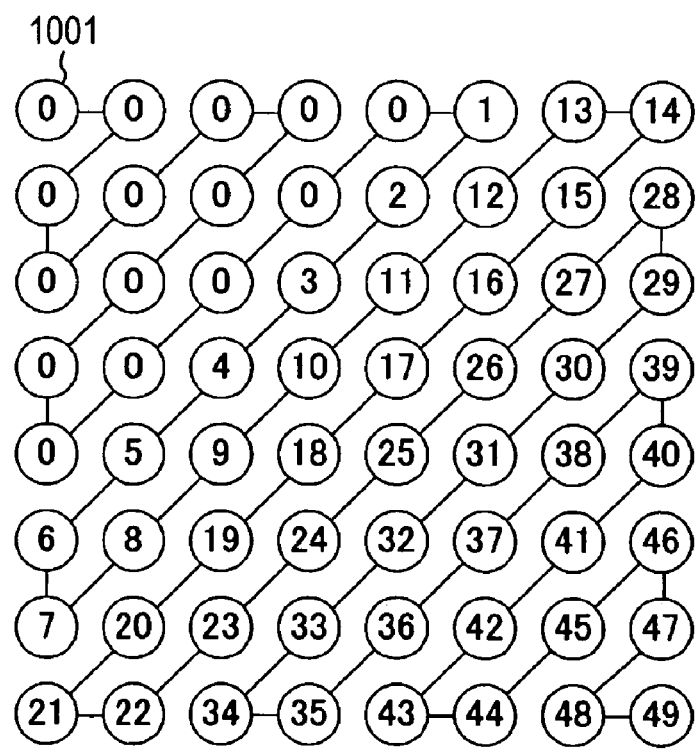
FIG. 10 shows exemplary weighting coefficients for discrete cosine transform (DCT) coefficients used in the third embodiment of the present invention.

FIG. 9 shows an exemplary defective area (defect) in an image according to the third embodiment. FIG. 10 shows exemplary weighting coefficients for DCT coefficients used in the third embodiment.

Referring to FIG. 9, a defective area 900 is surrounded by DCT blocks 901. The DCT coefficient of each of the DCT blocks 901 is quantified by multiplying it by the corresponding weighting coefficient shown in FIG. 10. The importance calculator 17 multiplies the DCT coefficients of all the DCT blocks 901 by the respective weighting coefficients shown in FIG. 10 and determines the average of the resultant values. That is, the importance calculator 17 determines a coefficient based on a spatial frequency (hereinafter referred to as "spatial frequency coefficient") as follows:

$$\left\{ \left[ \sum_{j=0}^{N} \sum_{i=0}^{64} (z(i) * f(i)) \right] \right\} / N \qquad \text{Equation 1}$$

where the number of the DCT blocks 901 surrounding the defective area 900 is N, the i-th DCT coefficient is z (i), and a weighting coefficient for the DCT coefficient z (i) is f (i).

For balance with the area coefficient described in the first embodiment, the importance calculator 17 multiplies the spatial frequency coefficient determined in Equation 1 by a constant k as follows:

$$\left\{ \left[ \sum_{j=0}^{N} \sum_{i=0}^{64} (z(i) * f(i)) \right] \right\} / N * k \qquad \text{Equation 2}$$

The importance calculator 17 determines the level of importance G (n) for determining the interpolation priority of the n-th defect by the following Equation 3 using an area coefficient R (n) and Equation 2 as follows:

$$G(n) = R(n) + \left\{ \left[ \sum_{j=0}^{N} \sum_{i=0}^{64} (z(i) * f(i)) \right] \right\} / N * k \qquad \text{Equation 3}$$

The interpolation priority determiner 18 determines a coefficient H (n) for determining an interpolation priority by the following Equation 4 using the level of importance G (n)

determined by the importance calculator 17, the level of correction difficulty D (n) determined by the interpolation priority determiner 18 itself, and a constant L for balancing between coefficients as follows:

$$H(n) = G(n) + D(n)*L \qquad \text{Equation 4}$$
$$= R(n) + \left\{ \left[ \sum_{j=0}^{N} \sum_{i=0}^{64} (z(i)*f(i)) \right] \right\} / N*k + D(n)*L$$

where the level of correction difficulty D (n) is determined by the method described in the first embodiment.

In the present embodiment, repeat operations are often required to determine, with respect to each image defect, a coefficient based on a spatial frequency. Since they are mostly simple operations, a coefficient calculation function may be implemented on the accelerator 106 of hardware as in FIG. 1 to accelerate the operations.

In the present embodiment, the importance calculator 17 uses the distance from the image center to each defect and a spatial frequency as factors to determine the importance. Using the spatial frequency allows a high level of importance to be assigned to a complex portion of an image. The interpolation priority determiner 18 uses the size of a defective area as a factor to determine the level of correction difficulty. Thus, an appropriate interpolation priority can be determined depending on the nature of each defect.

As a factor to determine the level of importance, the importance calculator 17 may use information as to whether the location of an area detected as a defect is the same as that of an area interpolated in the preceding frame of a moving image. The reason is that since the area interpolated in the preceding frame already differs from the original image, interpolation in the current frame needs to be performed in a manner that prevents the difference with the original image from increasing.

As a factor to determine the level of importance, the importance calculator 17 may extract an area that is assumed to contain a human facial image and assign a higher level of importance to this area. This is because a human face, which is a focal point in a moving image, needs to be displayed in a manner that it seems natural to viewers as much as possible. The importance calculator 17 can extract a human face area on the basis of particular shapes or colors, or by a variety of other methods. The importance calculator 17 may use information for identifying the human face area if the information processing apparatus 10 receives this information from the source of a moving image stream (the moving-image-stream distribution server 30 in the present embodiment).

As a factor to determine the level of importance, the importance calculator 17 may extract an area that is in focus and assign a higher level of importance to this area. For example, to extract such an area from a received image, the importance calculator 17 performs edge detection on an image area including defects and a portion with an intense edge is determined to be the area in focus. To extract an area in focus, the information processing apparatus 10 (receiving side) receives position information obtained when focus is achieved during shooting, and the importance calculator 17 may use this position information.

The importance calculator 17 may assign a higher level of importance to a lower color-saturation area, since differences in color saturation become more recognizable to human eye as color saturation decreases, and become less recognizable as color saturation increases.

The importance calculator 17 may assign a lower level of importance to an extremely dark area (noise area) and to an extremely bright area (saturated area).

The importance calculator 17 may use the size of a defective area as a factor to determine the level of importance.

As a factor to determine the level of correction difficulty, the interpolation priority determiner 18 may determine and use the average of the motion vectors of areas (such as the DCT blocks 901) surrounding a defect. The reason is that correction to the original image is considered difficult if the amount of motion is particularly large.

As a factor to determine the level of correction difficulty, the interpolation priority determiner 18 may use the amount of time required for performing interpolation by a method determined to be appropriate to correct (reduce) a defect (perform interpolation). As a factor to determine the level of correction difficulty, the interpolation priority determiner 18 may also use the above-described spatial frequency (because the level of difficulty increases as the spatial frequency increases), or the correlation between frames (because the level of difficulty increases as the correlation decreases).

In the present embodiment, the average value of the spatial frequency coefficients of all the DCT blocks 901 surrounding the defective area 900 is used as a coefficient for the defective area 900. However, the maximum value, instead of the average value, of the spatial frequency coefficients of all the DCT blocks 901 may be used as a coefficient for the defective area 900.

It is not always desirable that the coefficient for the level of correction difficulty be a positive (+) value. Since there may be the case where correction is less effective despite its difficulty, a negative (−) value may also be used to lower the priority.

Fourth Embodiment

An exemplary image processing apparatus according to the fourth embodiment of the present invention will now be described with reference to FIG. 11 and FIG. 12.

In the first and third embodiments described above, the information processing apparatus 10 uses the CPU 101 executing application software to perform interpolation for defects in a moving image. However, if interpolation is performed while an application is executed, sufficient interpolation may not be able to be achieved due to an increased load placed on the CPU 101.

Therefore, the fourth embodiment describes an image processing system that performs interpolation for defects in a moving image using special hardware differing from hardware for executing an application.

Figure 11:
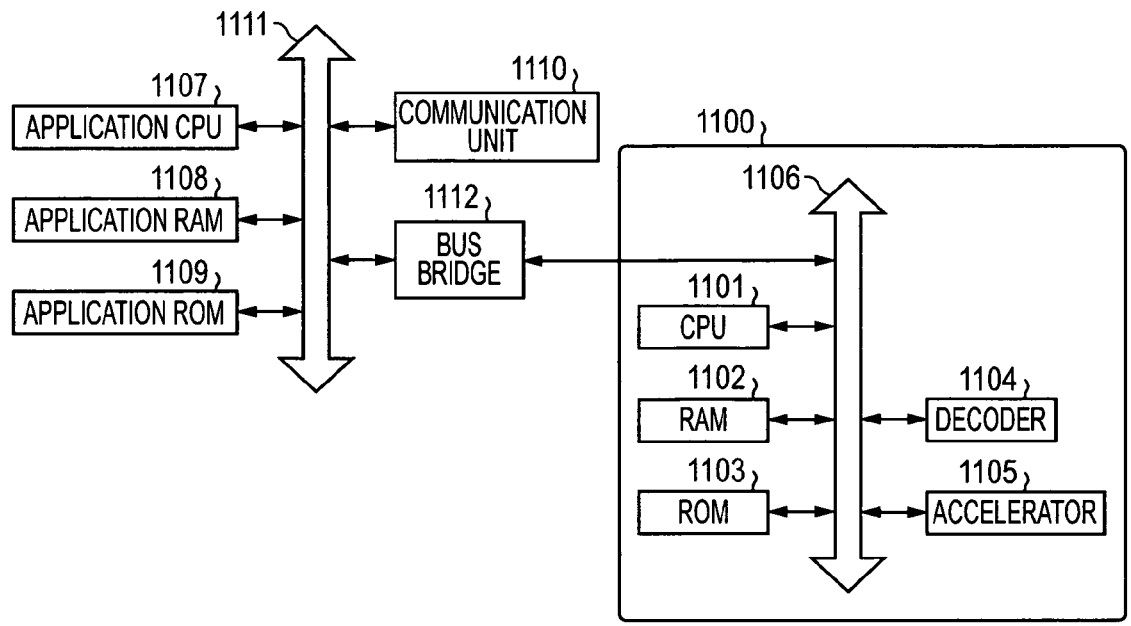
FIG. 11 shows an exemplary configuration of an image processing system according to a fourth embodiment of the present invention.

FIG. 11 shows an exemplary configuration of the image processing system according to the fourth embodiment. Referring to FIG. 11, components within a reference area 1100 constitute special hardware for performing interpolation for defects in a moving image transmitted via a communication medium, while components outside the reference area 1100 constitute hardware for executing an application. That is, a CPU 1101, a RAM 1102, and a ROM 1103 are included in the special hardware for performing interpolation for defects in a moving image. Moreover, a decoder 1104 for expanding a compressed moving image, and an accelerator 1105 for accelerating interpolation are also implemented within the special hardware. The CPU 1101, the RAM 1102, the ROM 1103, the decoder 1104, and the accelerator 1105 are connected via a special bus 1106.

The hardware for processing an application includes an application CPU 1107, an application RAM 1108, an application ROM 1109, a communication unit 1110, and an application bus 1111 for connecting these components. A bus bridge 1112 connects the hardware for processing an application to the hardware for performing interpolation for defects in a moving image. An operating system (OS) runs on the hardware for processing an application.

The special hardware specifically designed for performing interpolation for defects in a moving image not only reduces the load placed on the application CPU 1107 executing an application and on the application bus 1111, but also allows intensive interpolation to be performed in the special hardware. Moreover, the special hardware that is independently provided can be connected to another system or information processing apparatus and can easily provide the function of performing interpolation to the system or information processing apparatus.

The above-described special hardware, including the CPU 1101, for performing interpolation for defects in a moving image may be implemented on an application-specific integrated circuit (ASIC) or a field-programmable gate array (FPGA) to be contained in a single chip. This configuration allows the function of performing interpolation to be easily provided to other systems or information processing apparatuses. That is, implementing a module having the function of interpolation on an ASIC or FPGA not only increases the portability of the module, but also reduces processing load placed on a system provided with the function of interpolation. The present invention is not limited to implementing a module having the function of interpolation on an ASIC or FPGA. Any component on which the function of interpolation can be implemented is applicable.

The present embodiment describes the configuration in which the hardware for executing an application and the special hardware for performing interpolation are separated from each other and connected via the bus bridge 1112.

Figure 12:
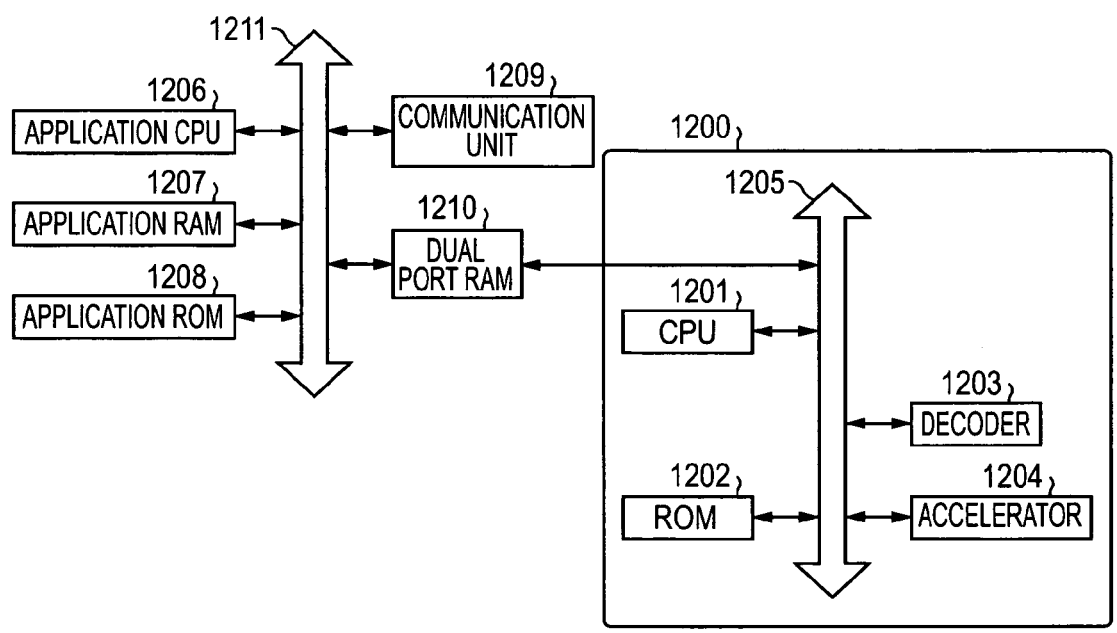
FIG. 12 shows another exemplary configuration of the image processing system according to the fourth embodiment of the present invention.

The configuration may be modified, for example, as in FIG. 12, which shows another exemplary configuration of the image processing system according to the fourth embodiment.

Referring to FIG. 12, components within a reference area 1200 constitute special hardware for performing interpolation for defects in a moving image transmitted via a communication medium, while components outside the reference area 1200 constitute hardware for executing an application. That is, a CPU 1201 and a ROM 1202 are included in the special hardware for performing interpolation for defects in a moving image. Moreover, a decoder 1203 for expanding a compressed moving image, and an accelerator 1204 for accelerating interpolation are also implemented within the special hardware. The CPU 1201, the ROM 1202, the decoder 1203, and the accelerator 1204 are connected via a special bus 1205.

The hardware for processing an application includes an application CPU 1206, an application RAM 1207, an application ROM 1208, a communication unit 1209, a dual port RAM 1210, and an application bus 1211 for connecting these components. The dual port RAM 1210 is also connected to the special bus 1205 and is accessible by the special hardware for performing interpolation. An OS runs on the hardware for processing an application.

The dual port RAM 1210 allows the hardware for executing an application and the special hardware for performing interpolation to share the RAM. Thus, a memory for processing moving image data can be shared between the hardware for executing an application and the special hardware for performing interpolation. Moreover, since the two separate RAM modules shown in FIG. 11 are combined into a single module, the configuration in FIG. 12 is advantageous in terms of reducing costs and mounting area.

Fifth Embodiment

An exemplary information processing apparatus of the fifth embodiment of the present invention will now be described with reference to FIG. 13. The configuration of the information processing apparatus of the fifth embodiment is the same as that of the information processing apparatus 10 shown in FIG. 1 and FIG. 2. The information processing apparatus 10 of the fifth embodiment is characterized in that the interpolation method determiner 16 estimates the total processing time required for all defects, and changes the interpolation method according to the estimation.

Figure 13:
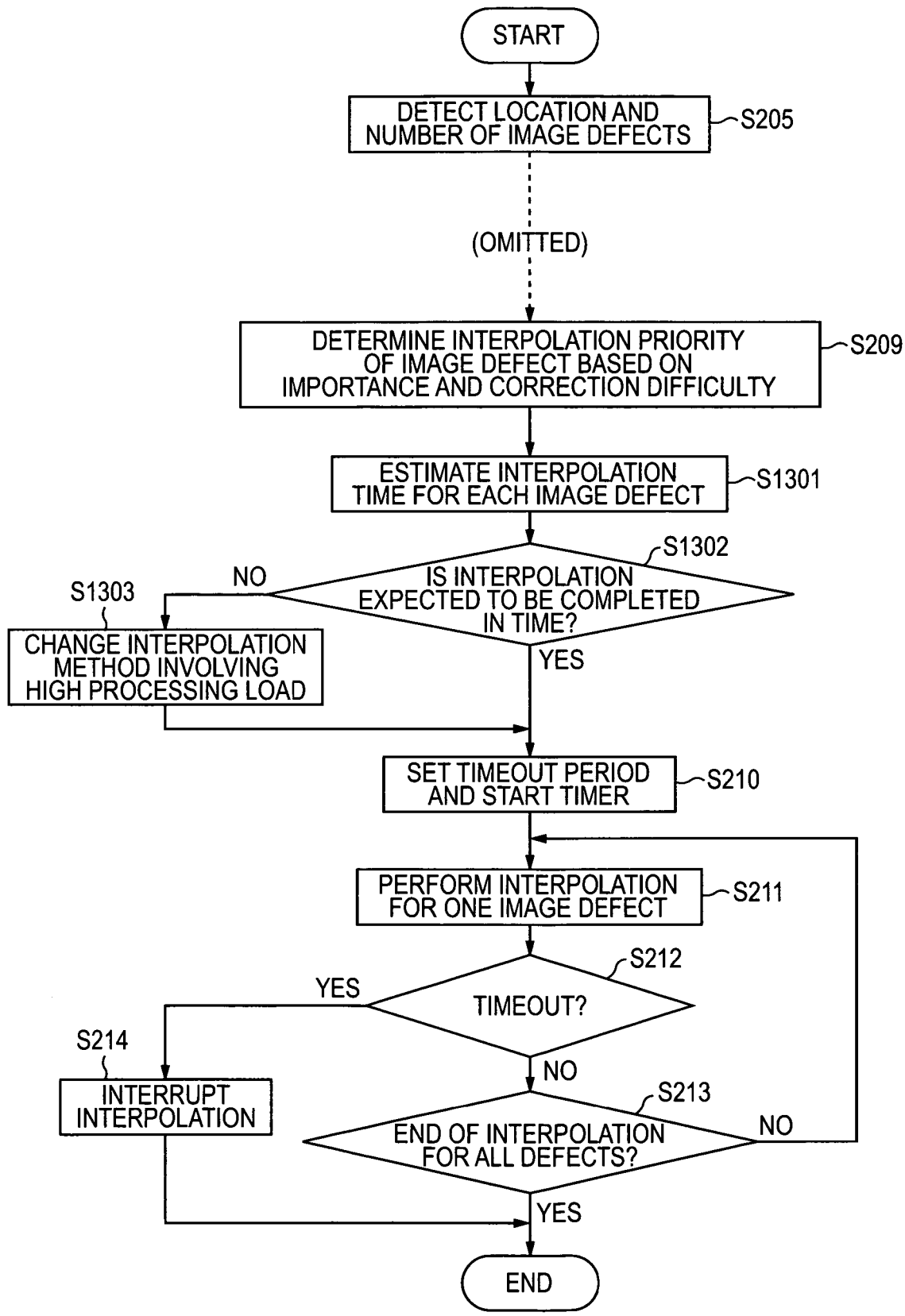
FIG. 13 is a flowchart showing an exemplary process of interpolation for defects in a moving image stream received by the information processing apparatus 10 of a fifth embodiment of the present invention.

FIG. 13 is a flowchart showing an exemplary process of interpolation for defects in a moving image stream received by the information processing apparatus 10 of the fifth embodiment. Steps S206 to S208 are omitted in FIG. 13 since processing in steps S205 to S214 in FIG. 13 is the same as that in steps S205 to S214 in FIG. 3B described in the first embodiment. Processing in FIG. 13 differs from that in FIG. 3B in that processing in steps S1301 to S1303 is performed between processing in steps S209 and S210.

The processing in steps S1301 to S1303 that characterizes the present embodiment and is performed by the information processing apparatus 10 is now described with reference to FIG. 13.

After image defects are detected, and an interpolation method and an interpolation priority for each defect are determined, the interpolation method determiner 16 estimates in step S1301 the total amount of time required to complete interpolation for all image defects.

Next, in step S1302, the interpolation method determiner 16 determines on the basis of the estimated total amount of time whether interpolation will be completed before interpolation for the next frame starts. If it is determined in step S1302 that interpolation for all defects will be completed, the process proceeds to step S210, where the timer processor 19 sets a timeout period and starts a timer. On the other hand, if it is determined in step S1302 that interpolation for all defects will not be completed, the process proceeds to step S1303, where the interpolation method determiner 16 changes existing interpolation methods that involve higher processing loads to different interpolation methods that involve lower processing loads. Then, the process proceeds to step S210. The subsequent processing is performed similarly to that in FIG. 3B.

One result of the present embodiment is that if a large number of defects are detected and interpolation methods involving complex processing are selected for the defects, the number of corrected defects and their proportion against the total number of detected defects are small due to limited timeout periods. This gives users the impression that only a limited number of image corrections have been made.

The information processing apparatus 10 of the present embodiment determines whether interpolation for all defects will be completed before interpolation for the next frame starts. Therefore, even if a large number of defects are detected and complex interpolation methods are assigned thereto, complex and time-consuming interpolation methods are replaced with less time-consuming methods if the information processing apparatus 10 determines that interpolation will not be completed in time. This not only reduces the number of defects for which interpolation has not been performed, but also significantly improves the appearance of moving images.

As describe above, in the image processing apparatuses (information processing apparatuses) and image processing systems of the present invention, defects in image data are not corrected by retransmission of the image data, but rather by performing an appropriate interpolation method selected from a plurality of available interpolation methods depending on the nature and degree of each defect.

In addition, in the image processing apparatuses (information processing apparatuses) and image processing systems of the present invention, interpolation is performed according to interpolation priorities determined on the basis of two parameters, the level of importance and the level of correction difficulty, which are calculated with respect to each image defect. This allows interpolation to be performed in order of priority, and thus in an efficient manner within the limited amount of processing time available for each frame.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2004-366467 filed Dec. 17, 2004, which is hereby incorporated by reference herein in its entirety.

What is claimed is:

1. An image processing apparatus configured to receive moving image data, comprising:
   a defect detecting unit configured to detect defects in received moving image data;
   a priority determining unit configured to determine a priority of a first defect and a priority of a second defect according to a distance from center of a frame of the moving image data to each of positions of the first and second defects in the frame when the first and second defects are detected from the frame of the moving image data; and
   an interpolation processing unit configured to perform interpolation of the first and second defects detected from the frame of the moving image data such that the first defect is interpolated and the second defect is not interpolated when the interpolation of the first defect which has the higher priority than the second defect can be completed within a time limit but the interpolation of both of the first and second defects cannot be completed within the time limit.

2. The image processing apparatus according to claim 1, further comprising:
   a difficulty-level determining unit configured to determine a level of difficulty in performing interpolation for each of the defects, based on a size of a display area of the defect, such that the level of difficulty of the first defect corresponding to a first display area is higher than the level of difficulty of the second defect corresponding to a second display area smaller than the first display area,
   wherein the priority determining unit determines the priority of the first and second defects based on the level of difficulty determined by the difficulty-level determining unit.

3. The image processing apparatus according to claim 1, further comprising:
   a time management unit configured to determine whether a timeout has occurred or not based on the time limit when the interpolation of the first defect is completed; and
   a stop instructing unit configured to instruct the interpolation processing unit to stop performing the interpolation such that the second defect which has the lower priority than the first defect is not interpolated if the time management unit determines that the timeout has occurred when the interpolation of the first defect is completed.

4. The image processing apparatus according to claim 1, further comprising:
   a location determining unit configured to determine whether the location of a defect is the same as the location of an area interpolated in the preceding frame,
   wherein the priority determining unit further uses the determination by the location determining unit to determine the priority of the first and second defects.

5. The image processing apparatus according to claim 1, further comprising:
   a face detecting unit configured to detect, in the received moving image data, an area that is presumed to contain a human facial image,
   wherein the priority determining unit further uses the result of detection by the face detecting unit to determine the priority of the first and second defects.

6. The image processing apparatus according to claim 1, further comprising:
   a focus detecting unit configured to detect, in the received moving image data, an area in focus,
   wherein the priority determining unit further uses the result of detection by the focus detecting unit to determine the priority of the first and second defects.

7. The image processing apparatus according to claim 1, further comprising:
   a frequency detecting unit configured to detect information related to a spatial frequency in an area including a defect in the received moving image data,
   wherein the priority determining unit further uses the result of detection by the frequency detecting unit to determine the priority of the first and second defects.

8. The image processing apparatus according to claim 1, further comprising:
   an area detecting unit configured to detect a size of the display area of each defect,
   wherein the priority determining unit further uses the result of detection by the area detecting unit to determine the priority of the first and second defects such that the level of importance of the first defect is higher than the level of importance of the second defect of which the display size is smaller than the display size of the first defect.

9. The image processing apparatus according to claim 1, further comprising:
   a motion detecting unit configured to detect the amount of motion of an area including a defect by comparison between frames,
   wherein the priority determining unit further uses the result of detection by the motion detecting unit to determine the priority of the first and second defects.

10. The image processing apparatus according to claim 1, further comprising:
    an interpolation-method determining unit configured to determine an interpolation method for each of the first defect and the second defect,
    wherein the priority determining unit determines a priority of the first defect and the second defect based on a performing time required for the interpolation method determined by the interpolation-method determining unit.

11. An image processing apparatus configured to receive moving image data comprising:
    a defect detecting unit configured to detect defects in received moving image data;

an interpolation-method determining unit configured to determine one or more interpolation methods for each defect;
a time determining unit configured to determine a performing time it takes to interpolate the defects by one or more interpolation methods determined by the interpolation-method determining unit; and
an interpolation-method changing unit configured to change at least one of the one or more interpolation methods determined by the interpolation-method determining unit to an interpolation method of which a performing time is shorter than a performing time of the one or more interpolation methods, based on the performing time determined by the time determining unit.

12. An image processing method for an image processing apparatus configured to receive moving image data, the image processing method comprising:
a defect detecting step of detecting defects in received moving image data;
a priority determining step of determining a priority of a first defect and a priority of a second defect according to a distance from center of a frame of the moving image data to each of positions of the first and second defects in the frame when the first and second defects from the frame of the moving image data; and
an interpolation processing step of performing interpolation of the first and second defects detected from theme frame of the moving image data such that the first defect is interpolated and the second defect is not interpolated when the interpolation of the first defect which has the higher priority than the second defect can be completed within a time limit but the interpolation of both of the first and second defects cannot be completed within the time limit.

13. A computer-readable storage medium storing a program for causing a computer configured to receive moving image data to execute an image processing method, the image processing method comprising:
a defect detecting step of detecting defects in received moving image data;
a priority determining step of determining a priority of a first defect and a priority of a second defect according to a distance from center of a frame of the moving image data to each of positions of the first and second defects in the frame when the first and second defects are detected from the frame of the moving image data; and
an interpolation processing step of performing interpolation of the first and second defects detected from the one frame of the moving image data such that the first defect is interpolated and the second defect is not interpolated when the interpolation of the first defect which has the higher priority than the second defect can be completed within a time limit but the interpolation of both of the first and second defects cannot be completed within the time limit.

14. The image processing apparatus according to claim 11, wherein the time determining unit determines whether or not the interpolation performed by the one or more interpolation methods determined by the interpolation-method determining unit is completed within a time limit, and the interpolation-method changing unit changes at least one of the one or more interpolation methods determined by the interpolation-method determining unit to an interpolation method of which the performing time is shorter than the performing time of the one or more interpolation methods, in a case where the time determining unit determines that the interpolation performed by the one or more interpolation methods for each defect is not completed within the time limit.

* * * * *